United States Patent
White

(10) Patent No.: US 6,408,392 B2
(45) Date of Patent: Jun. 18, 2002

(54) METHOD AND APPARATUS FOR PROVIDING CONFIGURATION INFORMATION IN A NETWORK

(75) Inventor: Gerry White, Tyngsboro, MA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/833,131

(22) Filed: Apr. 10, 2001

Related U.S. Application Data

(63) Continuation of application No. 09/010,391, filed on Jan. 21, 1998, now Pat. No. 6,233,687.

(51) Int. Cl.[7] .............................................. G06F 12/14
(52) U.S. Cl. ...................................... 713/201; 713/187
(58) Field of Search ................................ 713/201, 181, 713/187, 202; 380/4, 21, 23

(56) References Cited

U.S. PATENT DOCUMENTS

| | | | | |
|---|---|---|---|---|
| 5,495,533 A | * | 2/1996 | Linehan et al. | 380/21 |
| 5,673,316 A | * | 9/1997 | Auerbach et al. | 380/4 |
| 5,757,914 A | * | 5/1998 | McManis | 380/23 |
| 6,233,687 B1 | * | 5/2001 | White | 713/201 |

* cited by examiner

Primary Examiner—Bipin Shalwala
Assistant Examiner—Nitin Patel
(74) Attorney, Agent, or Firm—Blakely Sokoloff Taylor & Zafman LLP

(57) ABSTRACT

A method and apparatus for providing message authentication between a first device (such as a provisioning server) and a plurality of other devices (such as cable modems) without need to share a secret key between the first device and the plurality of second devices.

35 Claims, 8 Drawing Sheets

| CONFIGURATION SETTING #1 | CONFIGURATION SETTING #2 | . . . | CONFIGURATION SETTING #N | CM MIC | CMTS MIC |

FIG. 7

METHOD AND APPARATUS FOR PROVIDING CONFIGURATION INFORMATION IN A NETWORK

CROSS-REFERENCES TO RELATED APPLICATIONS

This is a continuation of U.S. patent application (Application Ser. No. 09/010,391)filed Jan. 21, 1998, which has now matured to U.S. Pat. No. 6,233,687.

BACKGROUND OF THE INVENTION

1. Field of the Invention

The present invention relates to the field information networking and more specifically to providing configuration from a subscriber to a provider in a network.

2. Description of the Related Art

Communication of configuration information between two devices in a network is known in the art. It is important, especially where the configuration information is communicated over an insecure communication network (such as the internet, publicly switched telephone network (PSTN), a cable network or the like) to allow for verification of the integrity of the configuration information. One way to allow for verification of the configuration information is to provide an integrity check field. The integrity check field is transmitted between the device originating the configuration information (the first device) and the device receiving the configuration information (the second device). The integrity check field may be calculated based on the configuration information and a secret code. Any number of methods are known to calculate an integrity check field. One method is to perform a hash function over the contents of a data file. A hash code is produced. For purposes of this application, the term data file refers to a set of information and is generally some binary encoded representation of the information. The data file may comprise information ranging from, for example, textual information to video. If the contents of the data file are altered, the hash function is designed to provide a high degree of assurance that a different hash value would result of the hash function were performed again on the modified data file. It is possible to perform the hash function on the contents of a data file (which is to be shared) and a secret key. The data file and the hash value are transferred from a first device to a second device. If the second device also knows the secret key, it can perform the same hash function and compare the resulting hash value with the hash value received from the first device. If the hash values match, the second device can know with a high degree of reliability that the data file was not changed in route.

One method of performing message authentication using a cryptographic hash function is described in Network Working Group Request for Comments (RFC) 2104, February, 1997 titled "HMAC: Keyed-Hashing for Message Authentication". One cryptographic hash function discussed in RFC 2104 is the so-called MD5 which is described in greater detail in Rivest, R., "The MD5 Message-Digest Algorithm", RFC 1321, April 1992.

One issue that exists message authentication using a cryptographic hash function is that it requires the first device and the second device to share the secret information. However, if the secret information is transmitted over the insecure communication network, it may be observed by a third party (an interloper). The interloper may then intercept the configuration file in route between the first device and the second device and modify the configuration file. As the secret is known to the interloper, the interloper may also recalculate the integrity check field so that the change to the configuration file will not be detectable by the second device.

Of course, it is possible to communicate the secret code over a secure communication channel (for example, it may be encrypted in transmission or delivered using an alternate communication channel such as manual delivery using a trusted courier between the first device and the second device).

Of course, it may be difficult to communicate the secret over a secure communication channel for any number of reasons. For example, the number of second devices may become large. As a result, not only is communication of the secret difficult simply as a result of the number of second devices, but the secrecy of the secrecy code may be called into question because it is shared with a large number of second devices. In addition, access to the second devices over a secure communications channel in certain networks may be problematic.

It would be useful to allow verification of a configuration file (or other data file) by a second device in an unsecure network without need to provide for secure communication of a secret code between the second device and the first device.

SUMMARY OF THE INVENTION

A method and apparatus for providing message authentication between a first device such as a provisioning server and a plurality of other devices (such as cable modems) without need to share a secret key between the first device and the plurality of second devices is described. The device providing the message computes two hash functions. The first hash function is computed over the entire data file but without use of any secret key. The second hash function is computed over at least a portion of the data file using a secret key. In some embodiments, the portion of the data file used in the computation of the second hash function may include the results of the first hash function. Thus, when a device receives the file and the hash function values, it can recompute the first hash function without need for the secret key. This allows detection of unsophisticated interloper where only the data file, but not the hash function was modified. The device can then send at least a portion of the data file, together with the two hash values, to another device (such as a cable modem termination system) who is trusted with the secret key. The other device can verify the second hash function. If the second hash function is not verified, the other device can send a message back to the second device informing it that the verification failed.

BRIEF DESCRIPTION OF THE DRAWINGS

FIG. 7 is a diagram illustrating a format of a portion of messages as may be communicated between the provisioning server and the cable modem in an embodiment of the present invention.

Figure 1:
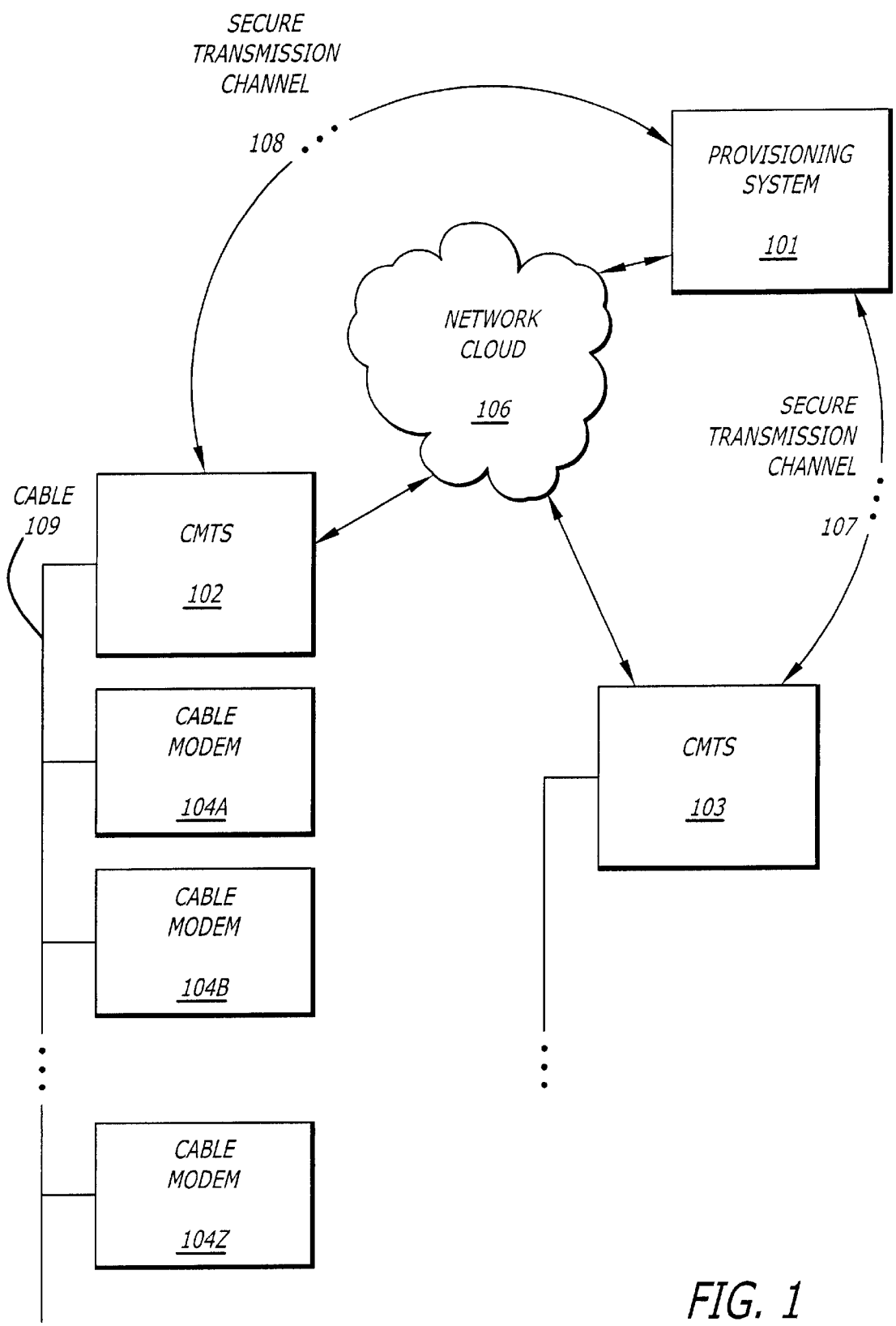
FIG. 1 is an overall diagram of a cable modem network as may implement the present invention.
Figure 3:
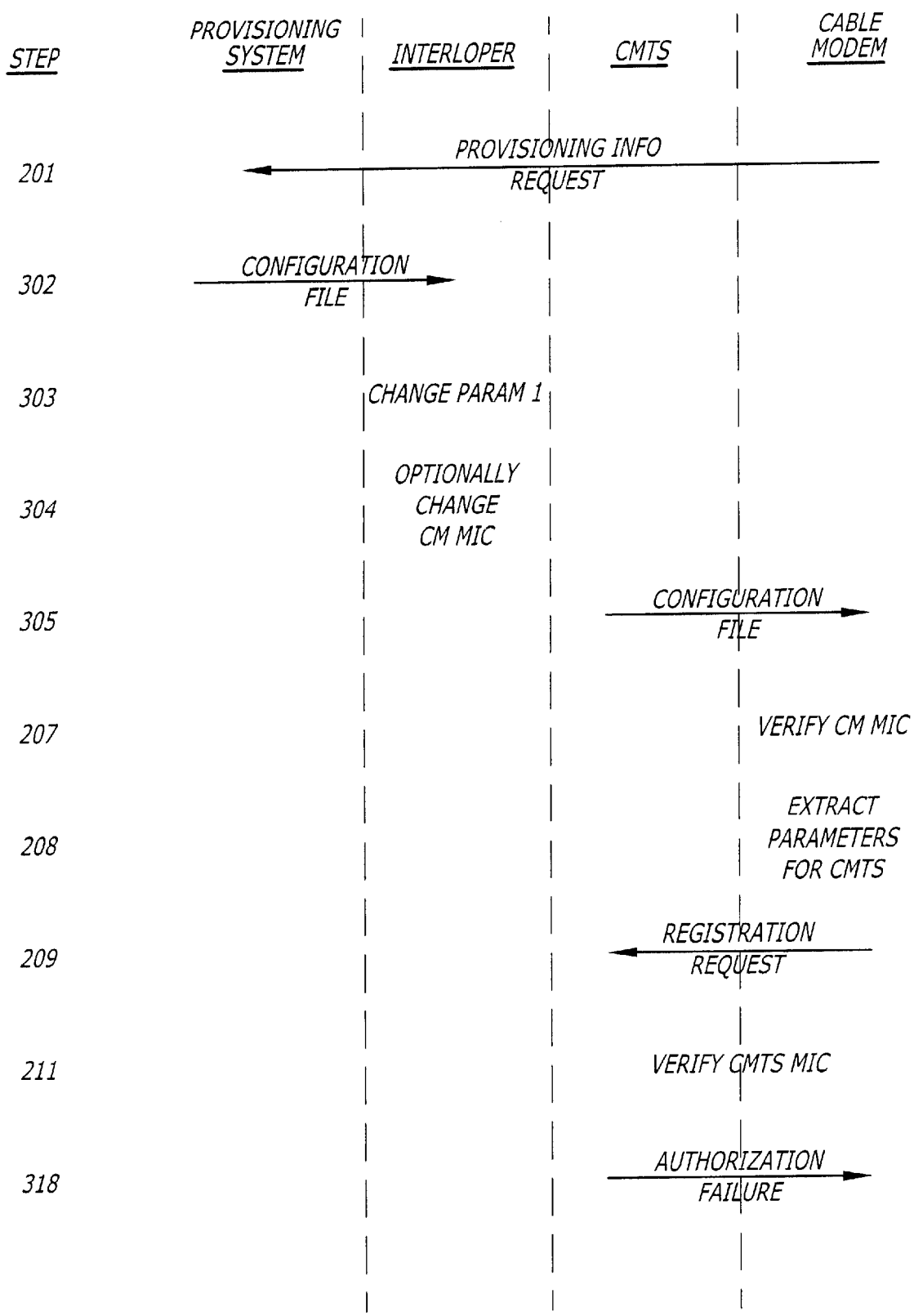
FIG. 3 is a flow diagram illustrating communication between a cable modem, a cable modem termination system, a provisioning system and an interloper as may be utilized by an embodiment of the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF AN EMBODIMENT OF THE PRESENT INVENTION

FIG. 1 illustrates an overall diagram of a cable modem network as may utilize the present invention. The present invention may be implemented in alternative networks. It would be most useful in networks requiring communication of a data file between a first device and a second device over an insecure communication channel where it is desirable to verify that the data file was not altered in transit between the first device and the second device.

In the described embodiment, the network comprises a provisioning system 101, a cable modem termination system (CMTS) 102 coupled in communication with the provisioning system over a network 106 and a plurality of cable modems (CM) 104A to 104Z. In addition to communication over the network cloud 106, the provisioning system is coupled to communicate with the CMTS over a secure communication channel 108. The secure communication channel may be any of a number of communication channels. For example, rather than providing a separate communication channel, information may be encrypted by the provisioning server 101 and decrypted by the CMTS 102. Alternatively, a separate physical channel may be provided or a manual means of communication information using a trusted courier may be utilized.

The network cloud 106 may be any of a number of conventional networks. In the described embodiment, an IP network is utilized. This network does not need to be a secure network.

A plurality of CMTS devices (such as CMTS 103) may be coupled in communication with a provisioning system 101. As illustrated, CMTS 103 is coupled in communication with the provisioning system over network cloud 106 and over secure transmission channel 107.

Figure 5:
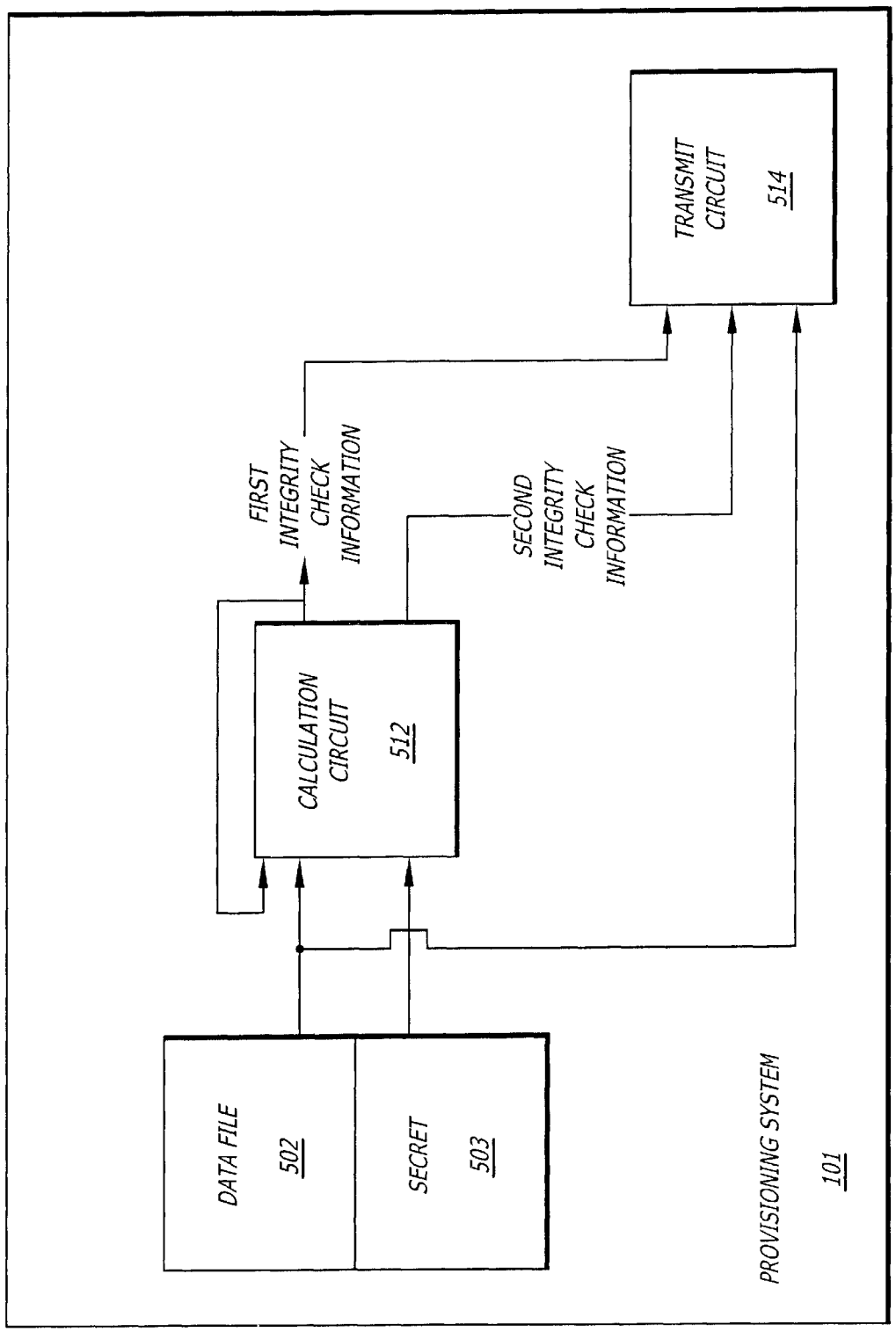
FIG. 5 is a block diagram illustrating aspects of a provisioning system as may be utilized by an embodiment of the present invention.

The provisioning system stores a data file for each of the cable modems 104A to 104Z. The provisioning information for each cable modem is based on the cable modem subscriber's subscription information. The provisioning system may comprise any of a number of conventional server platforms configured as will be described to in greater detail in connection with FIG. 5 to implement the present invention.

In the described embodiment, the data file comprises a number of parameters where each parameter is in the format:

type:length:value where a) type is a single-octet identifier which defines the parameter b) length is a single octet containing the length of the value field (not including type and length fields); and c) value is a field of length from one to 254 octets containing the specific value for the parameter.

In the described embodiment, the configuration settings are divided into three types:

a) standard configuration settings which must be present including:
   Downstream Frequency Configuration Setting
   Upstream Channel ID Configuration Setting
   Network Access Configuration Setting
   End Configuration Setting b) standard configuration settings which may be present including;
   Quality of Service Configuration Setting
   Vendor ID Configuration Setting
   Software Upgrade Filename Configuration Setting
   SNMP Write-Access Control
   SNMP MIB Object
   Pad Configuration Setting and c) vendor-specific configuration settings.

It is desirable to communication data file between the provisioning system 101 and each of the cable modems 104A to 104Z. However, it is also desired that the data file is not altered by the cable modems 104A to 104Z or by an interloper which may have access to the network. As will be described, at least a portion of the data file is communicated to the CMTS 102 by the cable modems 104A to 104Z. It is also desirable that the portion of the data file is not altered in transit between the transmitting data modem and the CMTS 102.

However, as can be appreciated, there may be a large number of cable modems coupled in the network and serviced by provisioning system 101. Therefore, communication of the data file over a secure channel is difficult. Furthermore, unless a separate secret code is provided for each cable modem, the secret code will be shared with a large number of cable modems and it may not be possible to trust all of the cable modem subscribers with the secret code.

Figure 2:
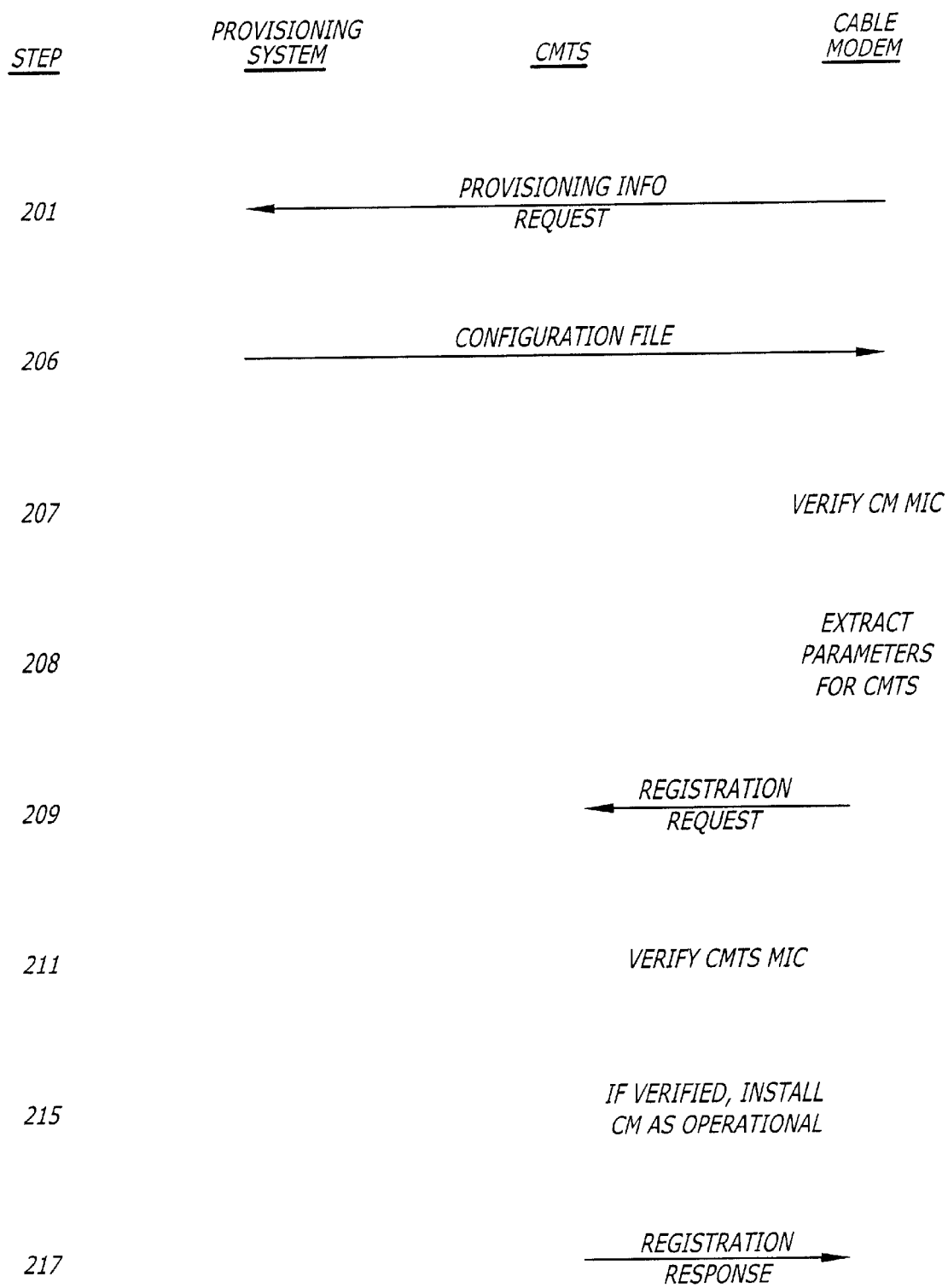
FIG. 2 is a flow diagram illustrating communication between a cable modem, a cable modem termination system and a provisioning system as may be utilized by an embodiment of the present invention.

FIG. 2 provides a flow diagram which is useful for describing a method of the described embodiment for communicating a data file between the provisioning system 101 and the individual cable modems 104A to 104Z over the insecure network cloud 106 and cable 109 while allowing verification of the data file by both the cable modems and the CMTS 102.

Initially, the provisioning information is requested by a cable modem such as cable modem 104A, step 201. The request is sent by the cable modem 104A over the cable 109 to the CMTS 102 where it is transmitted through the cloud 106 to the provisioning server 101.

Figure 8:
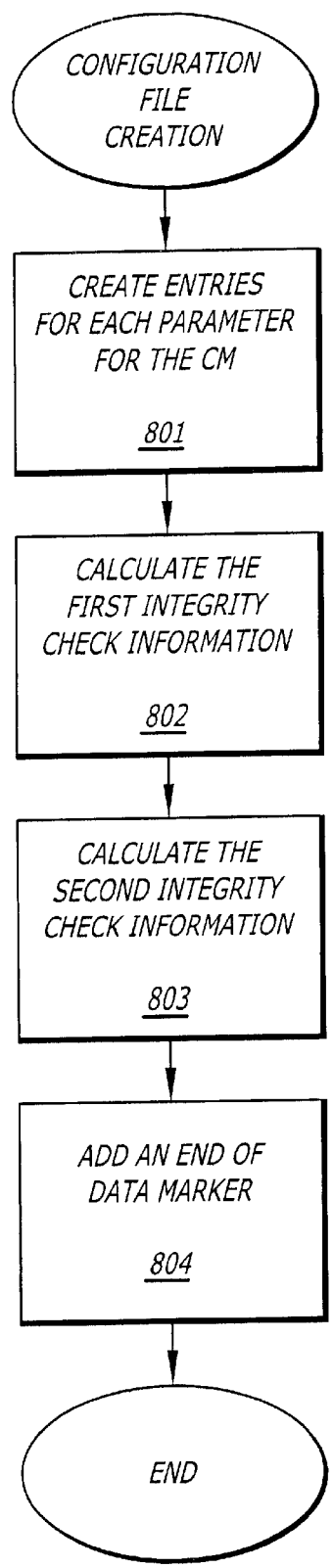
FIG. 8 is a flow diagram illustrating a method of creating a configuration file as may be utilized by an embodiment of the present invention.

The configuration file is generated by the provisioning server 101 in response to receiving the provisioning information request. FIG. 8 provides a flow diagram illustrating steps utilized in the described embodiment for generating the configuration. Initially, entries are created in the configuration for each parameter required by the cable modem making the request, step 801. The parameters may be stored as a data file 502. Next, first integrity check information is generated by a calculation circuit 512 using as an input the parameters from the data file 502, step 802. The integrity check information is sometimes alternatively referred to as "message integrity check" or MIC. The calculation circuit 512 in the described embodiment calculates a digest using the MD5 algorithm as specified in RFC 2104 as the first integrity check information. In the described embodiment, the first integrity check information is calculated over fields as illustrated in Table 1, below:

TABLE 1 type, length, value for parameter 1
type, length, value for parameter 2
type, length, value for parameter n where parameters 1, 2 . . . n correspond to the parameters described above.

It is noted that the first integrity value was not calculated using any secret value. Therefore, it would be possible for any interested interloper to change any parameter and recalculate the first integrity check information. Thus, the receiving device, e.g., the cable modem, would not be able to detect that the parameter had been altered through use of the first integrity check value. As will be seen, the present invention provides a method allowing the receiving device to verify integrity of the parameters without need to communicate a secret code to the receiving device.

Next, the second integrity check information is generated, step 803 Before discussing in greater detail the calculation of the second integrity check information, it is worthwhile to note that certain, but not necessarily all, of the parameters sent to the cable modem of the described embodiment must be shared with the CMTS. Therefore, the second integrity check information is calculated using as inputs a portion of the data file comprising the parameters which are required to be shared with the CMTS, a first integrity check information and a secret value or key. One advantage of using the first integrity check value as one of the inputs, as will be seen, is that the CMTS will be able to verify for the cable modem that none of parameters in the data file were changed during the communication over the insecure channel even though less than all of the parameters may be communicated back to the CMTS.

The resulting data structure including the parameters, the first integrity check information and the second integrity check information is illustrated in FIG. 7. In addition, in the described embodiment, an end of data marker is postpended to the data structure, step 804.

Referring again to FIG. 2, the configuration file (including the parameters, the first integrity check information, the second integrity check information and the end of data marker is transmitted by the provisioning server 101 to the cable modem 104A, step 206. While the described embodiment provides for transmission over network cloud 106 to CMTS 102 and then on cable 109 to cable modem 104A, the configuration file may be provided to the cable modem 104A using any of a number of alternative methods without departure from the spirit and scope of the present invention.

Figure 4:
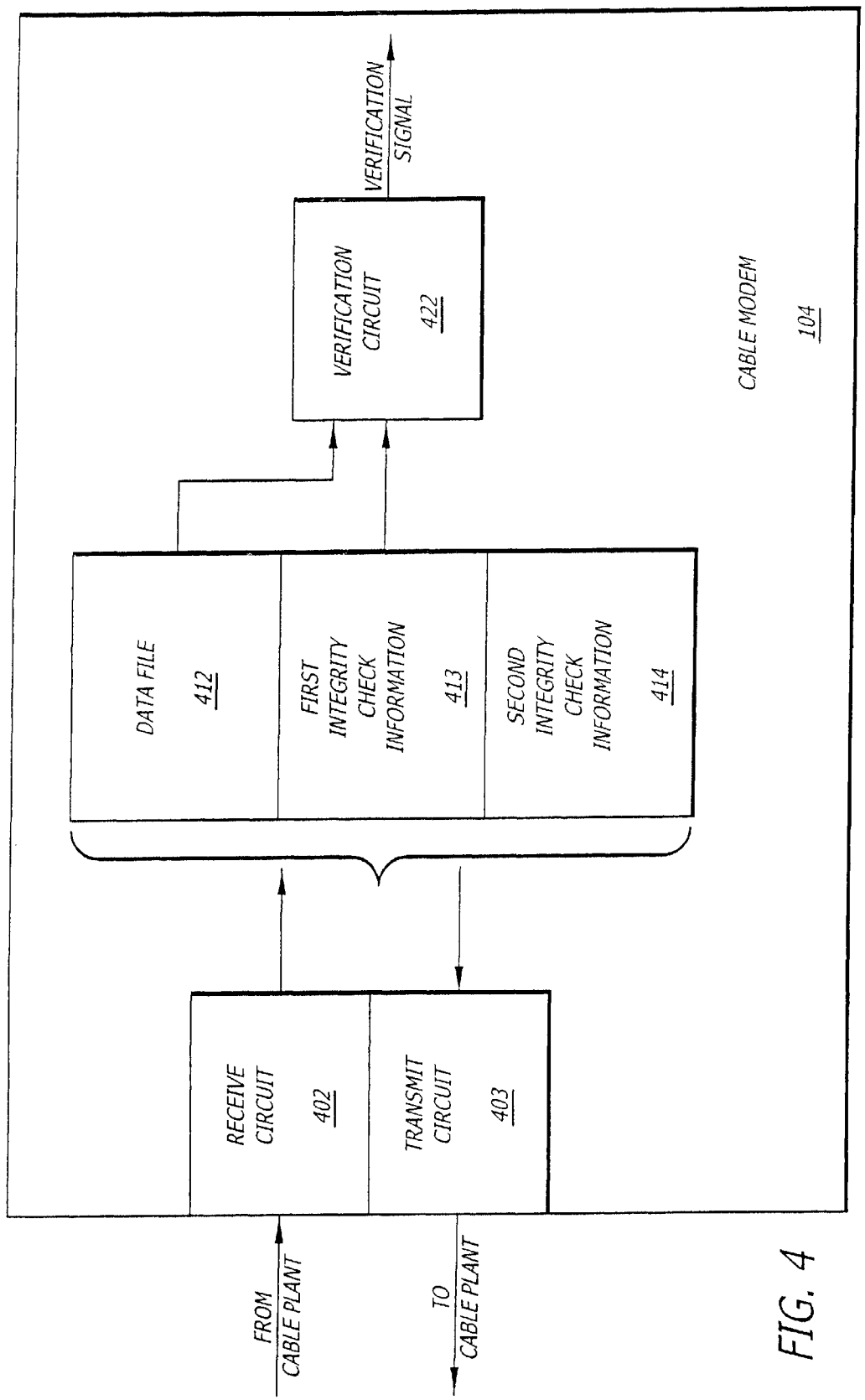
FIG. 4 is a block diagram illustrating aspects of a cable modem as may be utilized by an embodiment of the present invention.

The cable modem 104A receives the configuration file at receive circuit 402 and performs an MD5 digest on the parameter portions (illustrated as data file 412) of the configuration file in order to calculate an integrity check value. If the calculated integrity check value does not match the first integrity check value, the cable modem discards the configuration file because it is assumed that portions of the configuration file were tampered with while enroute from the provisioning server. This verification is illustrated in FIG. 4 by use of verification circuit 422 which receives as inputs data file 412 and first integrity check information 413. After calculating the MD5 digest over the data file, a comparison is made by circuit 422 of the calculated integrity value and the first integrity check information and a verification signal is provided indicating whether or not a match occurs. The second integrity check information 414 is received and stored at the cable mode 104 as illustrated, but is not directly utilized by the cable modem.

Of course, as has been mentioned, a sophisticated interloper may tamper with the configuration file and the tampering will go undetected by this step if the interloper simply recalculates the first integrity check value after changing one or more selected parameters.

In any event, assuming that the first integrity check information is verified, the cable modem 104 extracts from the data file 412 the parameters required to be sent to the CMTS 102, step 208. In the described embodiment, these parameters comprise:

Downstream Frequency Configuration Setting

Upstream Channel ID Configuration Setting

Network Access Configuration Setting

Quality of Service Configuration Setting

Modem Capabilities Configuration Setting

Vendor ID Configuration Setting

Vendor specific extensions

A registration request is then sent by the cable modem 104 to the CMTS 102 over the transmit circuit 403 and cable 108, step 209. In addition to the parameters specified above, the contents of the registration request include the following fields:

the first integrity check information;

the second integrity check information; and the cable modem IP address

Figure 6:
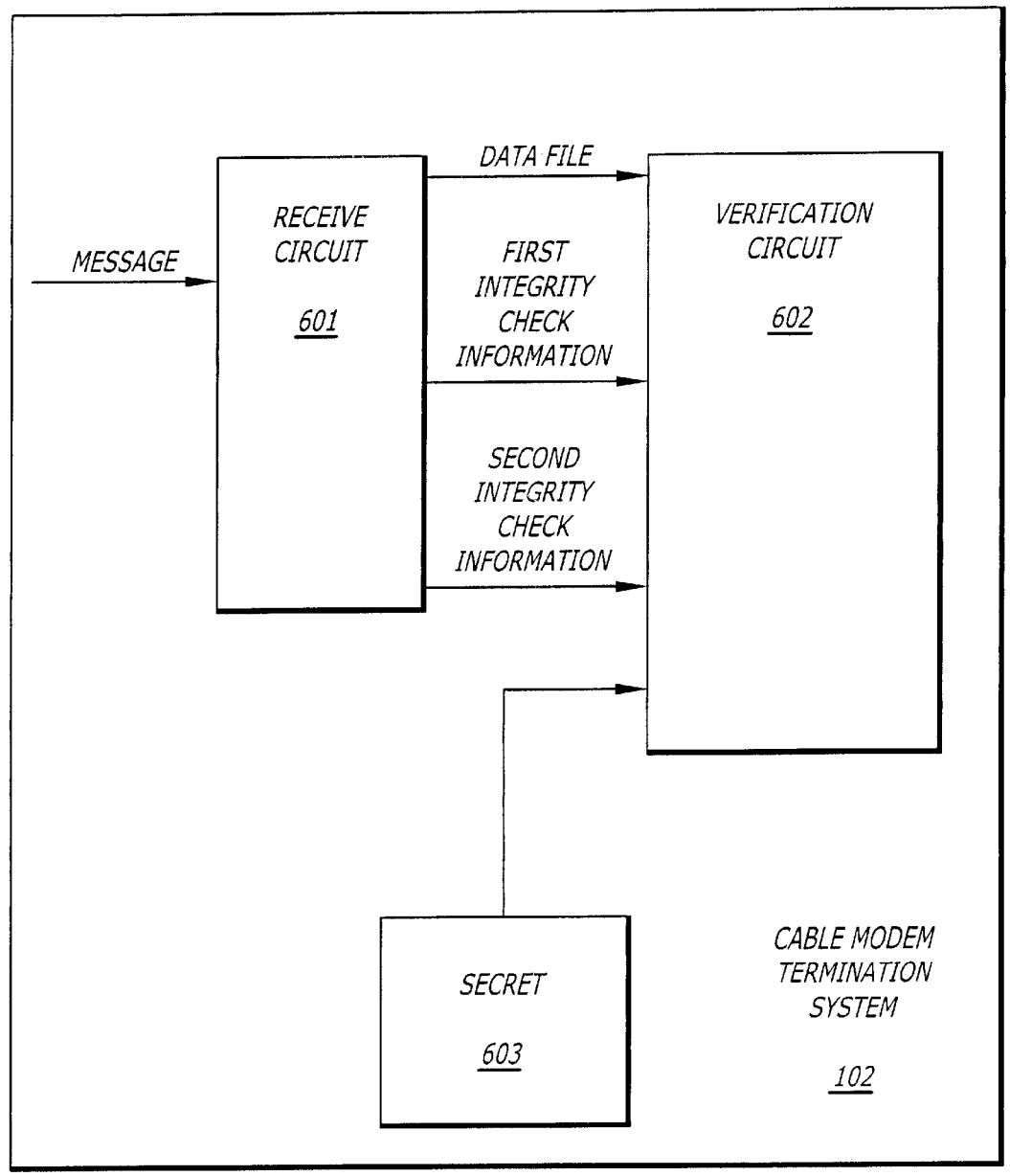
FIG. 6 is a block diagram illustrating aspects of a cable modem termination system as may be utilized by an embodiment of the present invention.

The CMTS receives the message on a receive circuit 601 as is illustrated in high level block diagram form by FIG. 6. The secret code used by provisioning system 101 was earlier provided to the CMTS over a secure channel 108 and is stored as secret 603.

The CMTS 102 verifies the second integrity check information by performing an MD5 digest over the transmitted parameters, the first integrity check information, and the secret 603 using a verification circuit 602, step 211. If the calculated integrity check information and the second integrity check information do not match, the registration request is rejected and an authorization failed message is returned as the registration response, step 217. If there is a match, the cable modem parameters are installed at the CMTS 102, step 215 and a valid registration response is returned.

It will be appreciated that when the cable modem receives a valid registration response, it can assume that no parameters were changed enroute between the provisioning system 101 and the cable modem. If there had been any change (and if the first integrity check information had also been modified by the interloper), the CMTS would not have calculated a matching integrity check value. This will be appreciated because the first integrity check value was an input to calculation of the second integrity check value.

FIG. 3 illustrates the interloper problem in greater detail. As is illustrated by FIG. 3, a provisioning information request is sent to the provisioning system, step 201, as was described in connection with FIG. 2. The configuration file is generated and transmitted, step 302. However, in the case, an interloper intercepts the configuration file and changes a parameter, step 303. For sake of example, assume that the parameter is one of the parameters which is not ultimately sent to the CMTS by the cable modem. As has been mentioned, a relatively unsophisticated interloper may simply change the parameter and not change the first integrity check information. As was discussed, this type of interference with the transmission of the configuration file will be detected by the cable modem directly. However, the sophisticated interloper may recalculate the first integrity check information, step 304. Although this interloper is termed a sophisticated interloper, in practice, recalculating the first integrity check is not particularly difficult since it is calculated based on information which is transmitted in the clear on an insecure channel using a standard algorithm.

In any event, the modified configuration is then received at the cable modem, step 305. Assuming the involvement of a "sophisticated interloper", the cable modem verifies the first integrity check information, step 207, extracts the parameters for the CMTS, step 208 and transmits a registration request, step 209, all as were described in connection with FIG. 2.

As was described in connection with FIG. 2, the CMTS verifies the second integrity check information, step 211. Because the first integrity check information was changed by the interloper, this check fails, and an authorization failure message is transmitted back to the cable modem. This failure is detected even though the parameter changed by the interloper is not transmitted to the CMTS.

ALTERNATIVES TO THE PREFERRED EMBODIMENT OF THE PRESENT INVENTION

There are, of course, alternatives to the described embodiment which are within the reach of one of ordinary skill in the relevant art. The present invention is intended to be limited only by the claims presented below.

Thus, what has been described is method and apparatus for allowing authentication of data files communicated from a central device (the provisioning system) to any number of second devices without need to share a secret code with the second devices.

I claim:

1. A method comprising:
   receiving a data file, a first integrity check information and a second integrity check information, the first integrity check information being calculated using a plurality of parameters of the data files as input and the second integrity check information being a digest calculated using as inputs at least one parameter of the plurality of parameters of the data file and the first integrity check information; and
   determining whether the data file has been altered during transmission.

2. The method as recited by claim 1 wherein the second integrity check information is calculated further using a secret key as an input.

3. The method as recited by claim 1 being performed by a cable modem.

4. The method as recited by claim 1 wherein in first integrity check information is a digest of the plurality of parameters.

5. The method as recited by claim 4 wherein each parameter of the plurality of parameters includes a type field, a length field and a value field.

6. The method as recited by claim 4 wherein the determining whether the data file has been altered includes
   extracting the plurality of parameters from the data file;
   calculating a digest based on the plurality of parameters;
   comparing the calculated digest to the first integrity check information; and
   determining that the data file has been altered when the calculated digest differs from the first integrity check information.

7. The method as recited by claim 1 wherein the at least one of the plurality of parameters comprises quality of service information.

8. A device comprising:
   a first circuit configured to receive a data file, a first integrity check information and a second integrity check information, the first integrity check information being calculated based on a plurality of parameters of the data file and the second integrity check information being calculated partially based on the first integrity check information; and
   a verification circuit configured to calculate a digest from the plurality of parameters and compare the digest to the first integrity check information.

9. The device as recited by claim 8 where the device is a cable modem.

10. The device as recited by claim 8 further comprising a second circuit configured to transmit at least a portion of the data file and the second integrity check information.

11. The device as recited by claim 8 wherein the first circuit is in communication with a provisioning system.

12. The device as recited by claim 8 where the first circuit is in communication with the provisioning system through a cable modem termination system over a cable.

13. The device as recited by claim 8 wherein the second circuit is coupled in communication with a cable modem termination system.

14. The device as recited by claim 8 wherein the verification circuit calculates the digest using an MD5 verification algorithm.

15. The device comprising:
   first means for receiving a data file, a first integrity check information and a second integrity check information, the first integrity check information is calculated based on a plurality of parameters of the data file and the second integrity check information is calculated based on the first integrity check information and a secret unknown to the device; and
   means for verifying integrity of the data file by (i) receiving the data file and the first integrity check information, (ii) calculating a digest from the plurality of parameters of the data file, and (iii) comparing the digest with the first integrity check information.

16. The device as recited by claim 15 wherein the device is a cable modem.

17. The device as recited in claim 15 further comprising:
   second means for transmitting at least a portion of the data file and the second integrity check information.

18. A method comprising:
   a) assembling a data file;
   b) calculating a first integrity check information, the first integrity check information calculated based on the data file;
   c) calculating a second integrity check information, the second integrity check information is a digest formed by at least one of the plurality of parameters being a portion of the data file and the first integrity check information;
   d) transmitting a message including the data file, the first integrity information and the second integrity information.

19. The method of claim 18, wherein the calculating of the second integrity check information includes forming a digest of the at least one of the plurality of parameters, the first integrity check information, and a secret.

20. The method as recited by claim 19 wherein the second integrity check information is a digest formed by at least one of the plurality of parameters being the portion of the data file, the first integrity check information and a secret.

21. The method as recited by claim 20 wherein the message is transmitted over a cable to a cable modem termination system.

22. The method as recited by claim 21 wherein the secret is transmitted to the cable modem termination system prior to calculation of the second integrity check information.

23. A method as recited by claim 21 wherein the secret is used by the cable modem termination system as a provisioning system to establish a secure transmission channel.

24. The method as recited by claim 18 being performed by a cable modem.

25. The method as recited by claim 18 wherein the first integrity check information is a digest of a plurality of parameters of the data file calculated using a hash algorithm.

26. A method for verifying a portion of a data file comprising:

receiving at a first device a message including a portion of a data file, a first integrity check information and a second integrity check information being a digest based in part on the first integrity check information; and verifying integrity of the portion of the data file by (1) computing a digest based on at least the portion of the data file and the first integrity check information and (2) comparing the digest against the second integrity check information.

27. The method as recited by claim 26 wherein verifying the portion of the data file further comprises retrieving a secret presented in the first device.

28. The method as recited by claim 27 wherein the digest is computed based on at least the portion of the data file, the first integrity check information and the secret.

29. The method as recited by claim 26 further comprising:

loading the portion of the data file into the first device; and transmitting an authorization succeeded message if portion of the data file is verified.

30. The method as recited by claim 29 wherein the authorization succeeded message is transmitted on a cable.

31. The method as recited by claim 26 further comprising transmitting an authorization failed message if the verifying integrity of the portion of the data file fails.

32. A device comprising:

a) a first circuit to receive a message including a portion of a data file, a first integrity check information and a second integrity check information being a digest based at least on the first integrity check information and the portion of the data file;

b) a second circuit to receive as inputs the data file, the first integrity check information, the second integrity check information and a secret and to provide a verification signal as an output, the verification signal to indicate whether the data file has been altered.

33. The device as recited by claim 32 wherein the device is a cable modem termination system.

34. The device as recited by claim 32 wherein the first circuit is in communication with a cable modem.

35. The device as recited by claim 32 further comprising a third circuit to transmit an authorization message to a cable modem.

\* \* \* \* \*

UNITED STATES PATENT AND TRADEMARK OFFICE
CERTIFICATE OF CORRECTION

PATENT NO. : 6,408,392 B2
DATED : June 18, 2002
INVENTOR(S) : White

It is certified that error appears in the above-identified patent and that said Letters Patent is hereby corrected as shown below:

Column 7,
Line 40, please delete "files" and insert -- file --.
Line 52, please delete "in" and insert -- the --.

Column 8,
Line 30, please delete "The" and insert -- A --.

Signed and Sealed this

Twenty-ninth Day of June, 2004

JON W. DUDAS
*Acting Director of the United States Patent and Trademark Office*